United States Patent [19]

Ciarlei et al.

[11] 4,375,804
[45] Mar. 8, 1983

[54] MULTIPLE POSITION LEG ASSEMBLY FOR A HEAT EXCHANGE UNIT

[75] Inventors: Joseph A. Ciarlei, Brewerton; William B. Jennings, Clay; Curtis L. Tobin, Chittenango, all of N.Y.

[73] Assignee: Carrier Corporation, Syracuse, N.Y.

[21] Appl. No.: 113,004

[22] Filed: Jan. 17, 1980

[51] Int. Cl.³ .................. F23J 11/00; A47B 3/00
[52] U.S. Cl. .................. 126/306; 126/304 R; 248/188.8; 248/677; 403/253; 403/254; 108/129
[58] Field of Search .......... 248/188.8, 188.91, 359, 248/188.6, 188, 677; 165/67, 68; 403/253, 254; 126/30, 50, 304 R, 304 A, 305, 306, 363, 38; 108/121, 129, 127, 131, 132

[56] References Cited

U.S. PATENT DOCUMENTS

| | | | |
|---|---|---|---|
| 1,476,542 | 12/1923 | Rasmussen | 248/359 |
| 1,750,730 | 3/1930 | Schmid | 165/68 |
| 1,827,951 | 10/1931 | Mummery | 126/38 |
| 2,071,182 | 2/1937 | Streenstrup | 165/67 |
| 2,397,766 | 4/1946 | Tullis | 126/38 |
| 3,156,282 | 11/1964 | Bedford | 403/254 |
| 3,272,196 | 9/1966 | Kueser | 126/38 |
| 3,532,370 | 10/1970 | Fenwick | 403/254 |

Primary Examiner—Samuel Scott
Assistant Examiner—G. Anderson
Attorney, Agent, or Firm—Donald F. Daley; Robert F. Hayter

[57] ABSTRACT

A multiple position leg assembly for a heat exchange unit is disclosed. A support surface has a pair of slots which coact with a leg such that the leg has a shipping position wherein it does not extend beyond the bottom of the unit and has a support position wherein it is securely fastened in the slots of the support surface to maintain the unit a preselected distance from a mounting structure. The leg is designed such that internal forces act to secure narrowed portions of the leg in the slots to provide a secure support for the unit.

9 Claims, 5 Drawing Figures

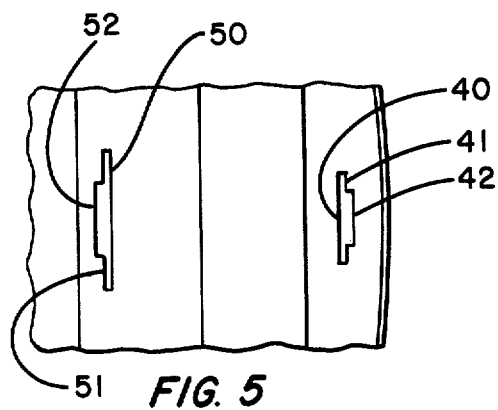
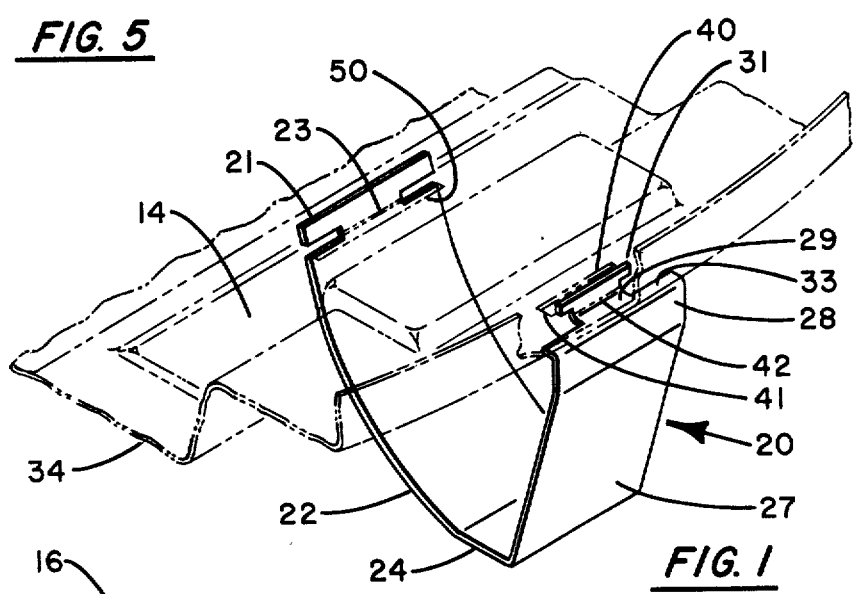
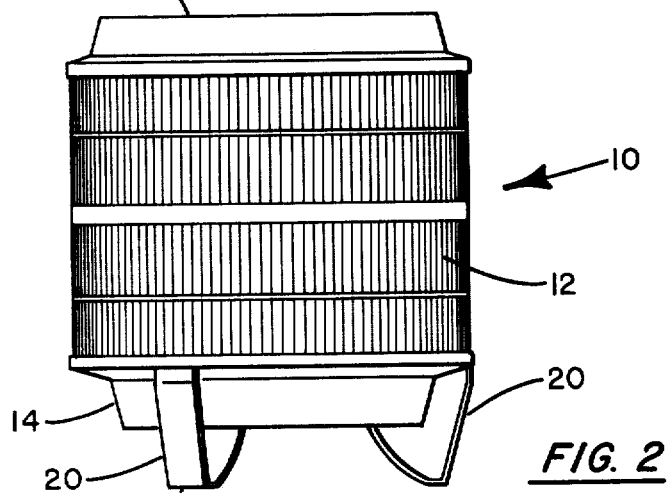

MULTIPLE POSITION LEG ASSEMBLY FOR A HEAT EXCHANGE UNIT

BACKGROUND OF THE INVENTION

1. Field of the Invention

This invention relates in general to leg assemblies and more particularly to a leg assembly having multiple positions for use in a heat exchange unit.

2. Prior Art

In a conventional residential split system air conditioning unit the condenser of the refrigeration circuit is located exterior of the residence. Typically, this unit has a condensing coil, a fan for circulating air over the condensing coil and may additionally have a compressor, reversing valve and various controls. This unit has been mounted on top of a concrete slab or various other pads to maintain the unit in a generally level manner.

For a reversible refrigeration circuit known as a heat pump, the outdoor unit is adapted to both serve as an evaporator and a condenser and is likewise mounted on a slab exterior of the residence. During heating season operation of the heat pump snow may accumulate around the heat exchanger. Consequently, leg assemblies have been provided for raising the unit off the ground. Additionally, during defrost of the heat pump unit, ice formed on the heat exchange surfaces is melted to water which drains from the unit. By raising the unit in the air with legs, it is possible to let the water drain away from the unit such that ice is not formed in the bottom of the outdoor unit.

Additionally, the leg assemblies as described herein may be used with free standing indoor units or any other unit which is positioned to be maintained on top of a support surface.

The present invention provides for leg assemblies which are adapted to be slid within the unit during shipping so that they do not project from the unit where they would be susceptible to be damaged or cause damage to some other component. Additionally, by providing the legs within the unit during shipping, it is possible to ship the unit in a smaller package. Also, these legs are designed, upon assembly of the unit, to be pulled from the unit such that the leg pivots on a pivot point and is drawn outwardly from the unit into a locked position securing the leg such that it can be used to support the unit. Typically, three of these legs may be used with an outdoor unit, although the specific number is subject to design consideration.

SUMMARY OF THE INVENTION

It is the object of this invention to provide a multiple position leg assembly for use in a heat exchange unit.

It is a further object of the present invention to provide a leg assembly which may be secured within the unit for shipping and withdrawn from the unit to serve as a support leg upon assembly.

Another object of the present invention is to provide a safe, economical, reliable, easy to manufacture leg assembly for use with a heat exchange unit.

Other objects will be apparent from the description to follow and the appended claims.

These and other objects are achieved according to the preferred embodiment of the present invention by the provision of a pair of spaced slots in the support surface in the bottom of the heat exchange unit. One of the slots is adapted to have one end of the leg assembly inserted therethrough such that the two coact providing a pivot point for rotation of the leg. The other slot is adapted to have the leg slide therethrough such that when the leg is rotated the portion of the leg extending through that slot reciprocates and the distance the leg extends from the bottom of the unit is varied. Additionally, the slot through which the leg slides has a reduced width portion which may coact with a reduced width portion of the leg to secure the leg in a predetermined position. The internal tension created in the leg during sliding helps to lock the leg into the reduced portion position such that a secure support is provided for maintaining the heat exchange unit a predetermined distance above the structure upon which it is mounted.

DESCRIPTION OF THE DRAWINGS

FIG. 1 is a perspective view of a portion of the support surface of the heat exchanger with the leg shown in the support position.

FIG. 2 is a side view of a heat exchanger showing the legs in relation to the remaining components of the unit.

FIG. 5 is a top view of a portion of the support surface showing the configuration of the fastening slot and the pivot slot.

DESCRIPTION OF THE PREFERRED EMBODIMENT

The embodiment described herein is designed for use with a heat exchange unit adapted to be mounted as the outdoor heat exchanger of a heat pump system. It is to be understood that this invention has like applicability to various heat exchange units and to heat exchange units of various designs, sizes and other considerations.

Referring now to FIG. 2 there can be seen a cylindrical heat exchange unit having a grille 12, discharge grille 16, base pan 14 and legs 20. This outdoor unit is arranged to have air flow through the grille 12 through the outdoor heat exchanger (not shown) contained within the unit and discharged out the top of the unit. Typically, a propeller type fan is mounted within the outdoor unit to circulate ambient air through the heat exchanger. The various components of the heat exchanger are mounted to the base pan 14 from which legs 20 extend. In the typical installation, legs 20 will be placed on a mounting pad which has been leveled to provide a level surface for supporting the heat exchanger.

Figure 3:
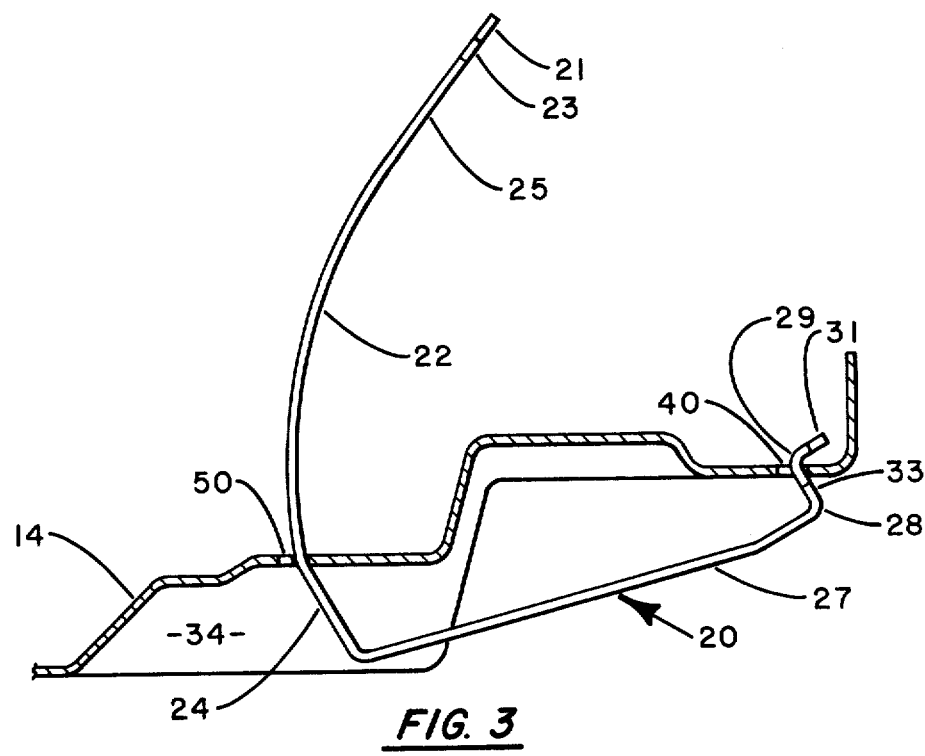
FIG. 3 is a sectional view of the leg and support surface showing the leg in the shipping position.
Figure 4:
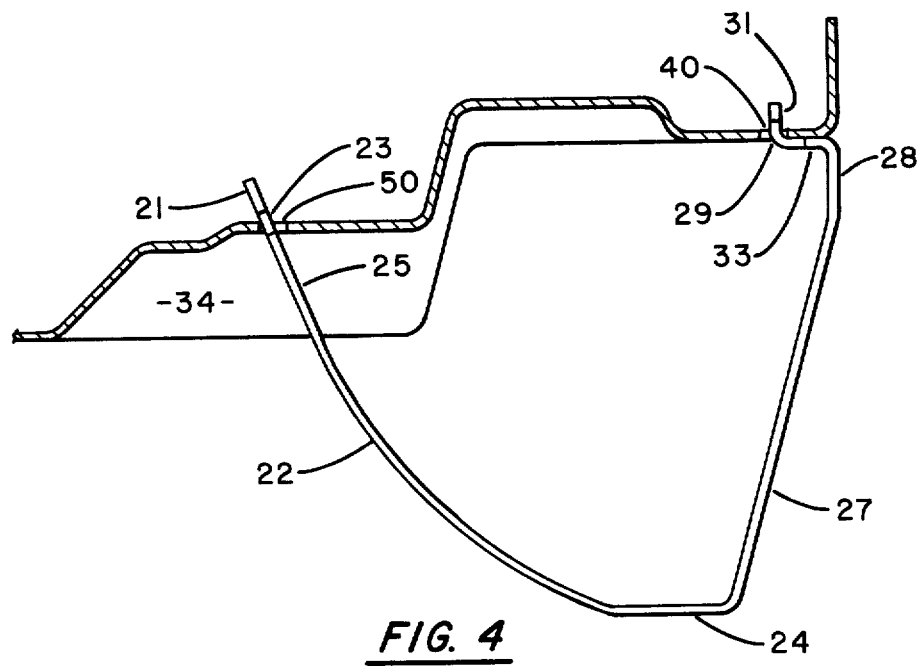
FIG. 4 is the same view as FIG. 3 showing the leg in the support position.

Referring now to FIGS. 1, 3 and 4, the relationships between the support surface which may be base pan 14 and legs 20 will be described. Within support surface 14 there are formed a pair of openings for each leg assembly. These openings are referred to as fastening slot 50 and pivot slot 40. FIG. 5 details the configurations of both slots. In FIG. 5 it can be seen that fastening slot 50 has a sliding portion 51 and reduced portion 52, the reduced portion having a width (top to bottom direction as seen in FIG. 5) less than the width of the sliding portion. FIG. 5 also shows pivot slot 40 having an insertion portion 41 and a necked portion 42. The necked portion 42 is of a width less than the insertion portion 41 which is of a width less than the sliding portion 51 of fastening slot 50.

Leg 20 is comprised of numerous portions. Commencing at the pivot end of the leg it can be seen that tab 31 is connected to necked portion 29 which is connected to contact portion 33 connected to angle portion 28. Angle portion 28 is connected to connecting portion 27 connected to mating portion 24 which is connected to radius portion 22 which is connected to straight portion 25. Straight portion 25 is connected to reduced portion 23 which is connected to fastening portion 21. Referring particularly to the pivot end of the leg it can be seen that tab 31 is reduced in width as compared to the width of leg 20 such that it may be inserted through the insertion portion 41 of pivot slot 40 in the support surface. Necked portion 29 of the leg 20 is of lesser width than tab portion 31 and fits within necked portion 42 of pivot slot 40 such that the tab portion 31 engages the top surface of support surface 14 to secure same therein. Contact portion 33 of the leg may contact the bottom surface of the support surface.

Mating portion 24 is so arranged that when the leg is in the support position it is parallel with the support surface and contacts the mounting structure to which the unit is being mounted. The radius portion 22 of the leg is designed to be equidistant from the pivot point of the leg such that the leg may easily slide through fastening slot 50. Straight portion 25 connected to the radius portion gradually increases in distance from the pivot point of the leg. Consequently, as the leg is rotated beyond the radius portion there is internal compression on the leg forcing the ends of the legs outwardly. Reduced portion 23 of the leg is adapted to coact with reduced portion 52 of fastening slot 50 such that if the leg is rotated sufficiently the reduced portion 23 of the leg will be forced into reduced portion 52 of slot 50. Fastening portion 21 is wider than reduced portion 23 and will engage the top surface of the support surface to prevent the leg from being further pulled downwardly from the unit. The top portion of the straight portion will likewise engage the bottom of the support surface to support same when the leg is placed in the support position.

Referring now to FIG. 3 it can be seen that the leg is in the shipping position. In this position, radius portion 22 as well as straight portion 25, reduced portion 23 and fastening portion 21 of the leg are located within the unit. Mating portion 24 is located on the opposite side of support surface 14 from the radius portion 22. The support surface 14 has a recessed area 34 therein into which the mating surface is placed in the shipping position such that no portion of the leg extends downwardly beyond the bottom of the support surface. It can be seen in FIG. 3 that the leg extends through the sliding portion 51 of fastening slot 50 such that the leg may be rotated sliding through the sliding portion between the two positions. While the leg is in the shipping position it can be seen that the tubular portion 31 is above the support surface and that necked portion 29 extends through the necked portion 42 of slot 40 to maintain the leg in that position.

Referring now to FIG. 4 the leg can be seen in the support position. In this position, tab 31 is located on one side of the support surface as opposed to contact portion 33. Mating surface 24 is shown located parallel to support surface 14 and reduced portion 23 of the leg is shown engaged within reduced portion 52 of the slot. In this position it can be seen that the overall unit is supported by the leg with mating surface 24 contacting the mounting structure. Force transferred from the unit downwardly is transferred to the leg at contact portion 33 and to the top surface of straight portion 25 which engages the bottom surface of the support surface.

It can be seen generally in FIGS. 1 and 4 that the radial distance from the pivot point to radius portion 22 is constant. Hence, when the assembler erects the unit, the leg will easily rotate from the shipping position to a position where the straight portion 25 starts to slide through sliding portion 51 of the fastening slot. To additionally rotate the leg an applied force is necessary since the distance between the pivot point and the straight portion must be reduced to have the leg slide through the fastening slot in fixed relation with the pivot slot. Since the leg is resilient, a force is exerted pushing the two ends of the leg outwardly since the leg is compressed as it slides through the fastening slot. This force results in the reduced portion 23 snapping into the reduced portion 52 of the fastening slot when the leg reaches the support position. This force additionally pushes the necked portion 29 of the leg into the necked portion 42 of pivot slot 40 to maintain that relation as well.

The above preferred embodiment describes a single leg for supporting a heat exchanger assembly using a combination of slots and leg configurations. It is to be understood that it is within the spirit and scope of this invention to effect variations and modifications in the specific slot dimension as well as leg portions to achieve the same purpose. It is to be additionally understood that this application has like applicability to various types of support structures for applications of the outdoor unit of a heat pump system.

We claim:

1. A support assembly for use with a heat exchange unit, said assembly having a shipping position and a support position which comprises:

a support surface defining a pivot slot having an insertion portion and a necked portion and a fastening slot having a sliding portion and a reduced portion, said pivot slot being spaced a predetermined distance from the fastening slot, said support surface further defining an area recessed from the bottom of the heat exchange unit and the fastening slot being defined within that portion of the support surface defining the top of the recessed area; and a leg having pivot means formed as a portion thereof to coact with the pivot slot for securing the pivot end of the leg, a mating surface for supporting the leg when it is in the support position, a contact surface for supporting the support surface adjacent the pivot means, a radius portion connected to the mating portion and fastening means connected to the radius portion and adapted to coact with the fastening slot to secure the leg in the support position with the mating surface projecting to support the unit and said fastening means and radius portion being sized to slide through the fastening slot to place the leg in the shipping position with the mating surface being located below the fastening slot within the recessed area defined by the support surface whereby the leg does not extend below the unit when it is in the shipping position.

2. The apparatus as set forth in claim 1 wherein the pivot means comprises a necked portion of the leg having a width less than the width of the leg and a tab portion having a width less than the width of the leg and greater than the width of the necked portion and wherein the insertion portion of the pivot slot is sized to allow the tab portion of the leg to be inserted therethrough and the necked portion of the pivot slot is sized to allow the necked portion of the leg to be inserted therethrough and is further sized to prevent the tab portion of the leg from moving therethrough whereby the tab portion of the leg may be inserted through the insertion portion of the slot and be retained in the pivot slot by the necked portion thereof.

3. The apparatus as set forth in claim 1 wherein the fastening means comprises a reduced portion of the leg having a width less than the width of the leg and a fastening portion of the leg having a width greater than the width of the reduced portion and wherein the sliding portion of the fastening slot is sized to allow the leg to slide therethrough, and wherein the reduced portion of the fastening slot is sized to receive the reduced portion of the leg and not to receive the remainder of the leg or the fastening portion of the leg whereby the leg may slide through the sliding portion of the fastening slot or the reduced portion of the leg may be secured in the reduced portion of the fastening slot.

4. The apparatus as set forth in claim 3 or 4 wherein the leg comprises:
   a single element bent to the appropriate configuration and having portions removed therefrom to form the reduced portion, the necked portion and the tab portion.

5. The apparatus as set forth in claim 1 wherein the leg pivots about the pivot means
   wherein the leg has a radius portion adapted to slide through the fastening slot as the leg is rotated about the pivot means; and
   wherein the leg has a straight portion connected to the radius portion, said straight portion acting to create a frictional fit with the fastening slot as the leg is rotated since the relative position of the slots has not changed but the distance between the pivot means and the straight portion increases as measured from the straight portion to the pivot means traveling along the leg away from the radius portion.

6. A heat exchange unit including a heat exchanger having a generally planar bottom surface adapted to be mounted a predetermined distance from a mounting structure which comprises:
   a support surface to which the components of the heat exchange unit are secured, said support surface further defining at least one pair of slots, each pair of slots including a pivot slot and a fastening slot, said support surface further defining a recessed area extending from the generally planar bottom surface with said fastening slot being defined in the top of the recessed area; and
   at least one leg adapted to be secured by the pair of slots in either a shipping position or a support position, said leg having pivot means formed as a portion thereof adapted to coact with the pivot slot, a contact surface for supporting the support surface adjacent the pivot means, a mating portion for engaging the mounting structure when the leg is in the support position, a radius portion connected to the mating portion and having fastening means adapted to coact with the fastening slot for securing the leg in the support position, said radius portion being curved to allow the leg to rotate about the pivot means into a shipping position with the radius portion extending through the fastening slot and the mating portion being configured to not extend through the fastening slot while being located within the recessed area defined by the support surface such that the leg does not extend below the planar bottom surface in the shipping position.

7. The apparatus as set forth in claim 6 wherein the fastening slot has a sliding portion through which the leg may travel and a reduced portion of a width less than the sliding portion and wherein the fastening means includes a reduced portion of the leg which may be inserted into the reduced portion of the slot to secure the leg in the support position.

8. The apparatus as set forth in claim 7 wherein the slots are positioned a predetermined distance apart and wherein the leg is configured such that it has a radius portion located from the pivot means approximately the same distance as the distance between the slots and has a straight portion which extends such that the distance from the pivot means to the straight portion increases such that the leg may slide freely through the fastening slot only a predetermined amount.

9. The apparatus as set forth in claim 8 wherein the leg is resilient and wherein the change in radial distance along the straight portion acts to compress the leg creating a force which acts to secure the reduced portion of the leg in the reduced portion of the fastening slot.

* * * * *